April 17, 1934.  C. A. SCHMIDT  1,955,096
FORCED DRAFT EXHAUST HEATER FOR MOTOR VEHICLES
Filed Jan. 4, 1930  3 Sheets-Sheet 1
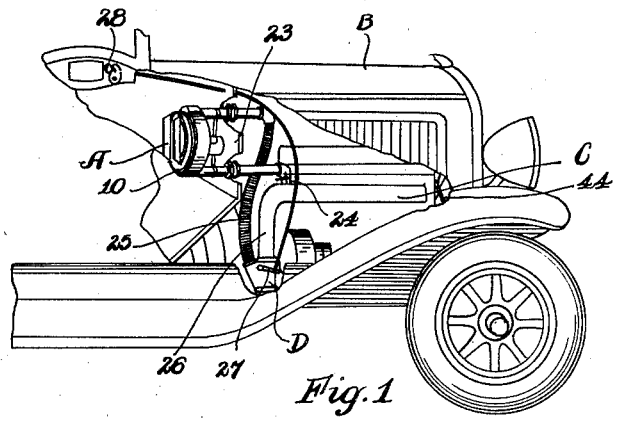
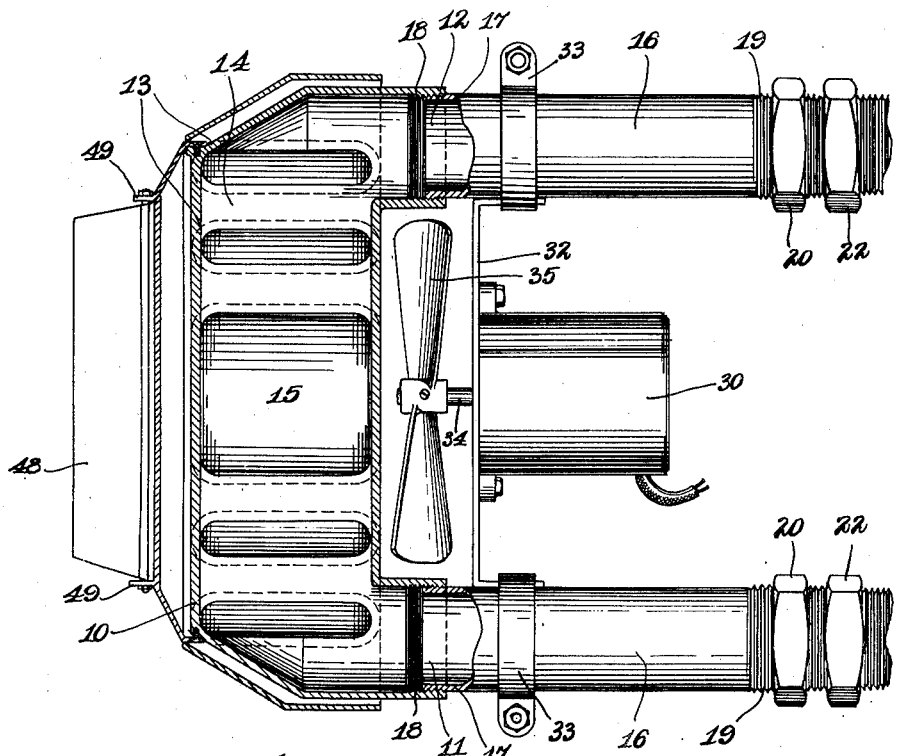
Inventor
Carl A. Schmidt
By Howard Fischer
Attorney April 17, 1934.   C. A. SCHMIDT   1,955,096
FORCED DRAFT EXHAUST HEATER FOR MOTOR VEHICLES
Filed Jan. 4, 1930   3 Sheets-Sheet 2
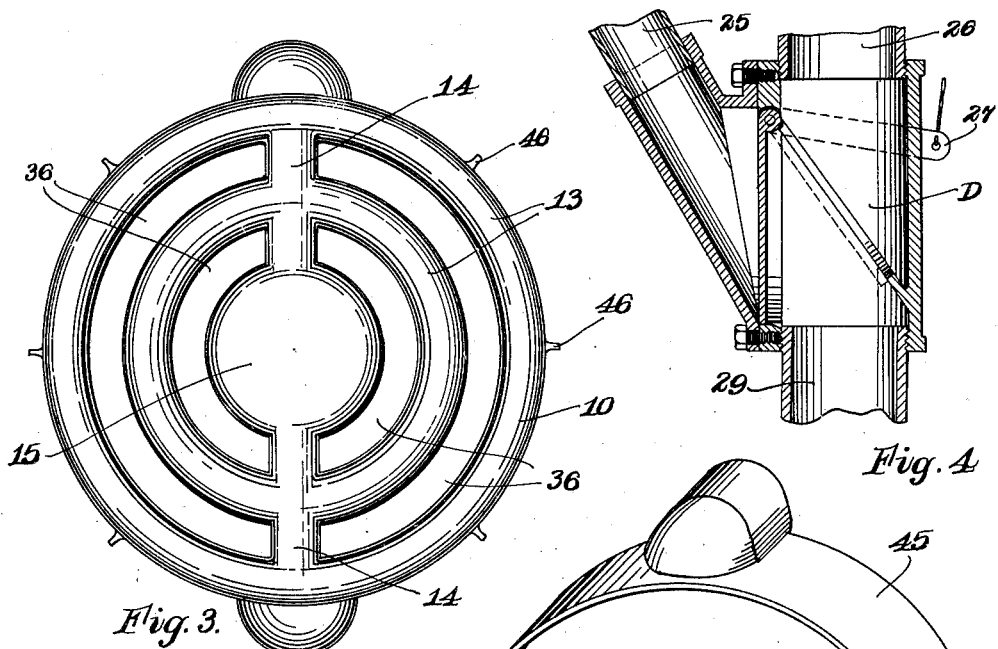
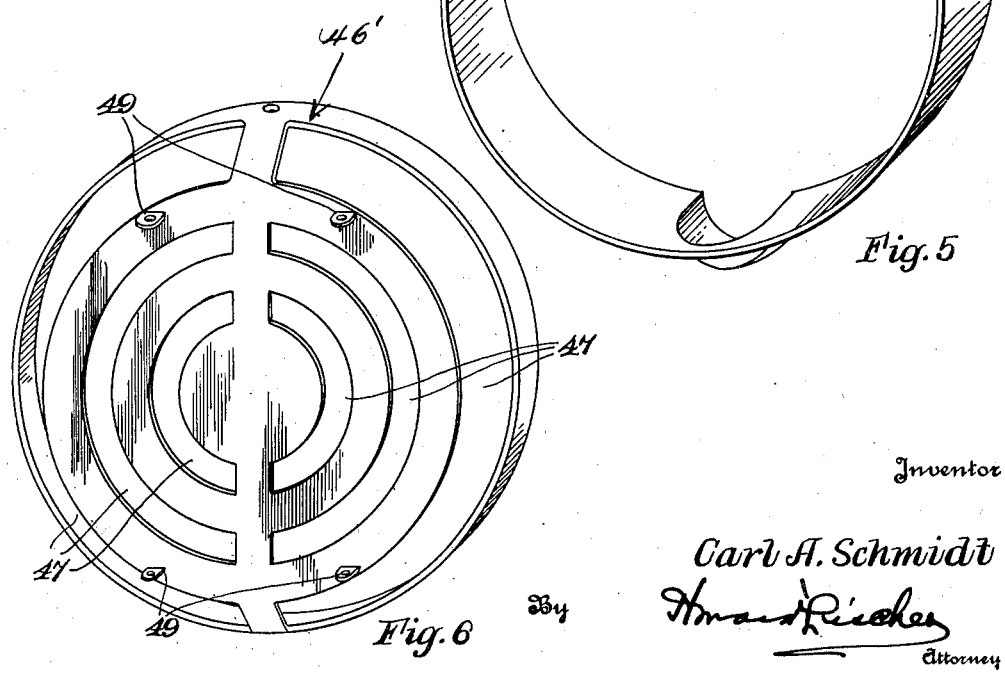
Inventor
Carl A. Schmidt
By
Attorney April 17, 1934.　　　C. A. SCHMIDT　　　1,955,096
FORCED DRAFT EXHAUST HEATER FOR MOTOR VEHICLES
Filed Jan. 4, 1930　　　3 Sheets-Sheet 3

Inventor
Carl A. Schmidt
By
Attorney

Patented Apr. 17, 1934

1,955,096

UNITED STATES PATENT OFFICE 1,955,096

FORCED DRAFT EXHAUST HEATER FOR MOTOR VEHICLES

Carl A. Schmidt, St. Paul, Minn., assignor to Ashco Corporation, St. Paul, Minn., a corporation of Minnesota Application January 4, 1930, Serial No. 418,508

7 Claims. (Cl. 257—137)

My invention relates to an improvement in forced draft exhaust heaters designed to be used in conjunction with motor vehicles, and is of a nature to heat the air within the vehicle or to heat fresh cold air and circulate it within the vehicle to make the same more comfortable for the occupants therein in cold weather.

A feature of my invention resides in the heating of air by forcing it past a radiator casting or heating coil heated by the exhaust gases taken from the hottest portion of the exhaust pipe of the motor and causing it to be blown out into the body of the car where it is free to circulate throughout the car and warm the entire interior thereof.

It is my object to provide a radiator coil heater within the body of the car which operates in conjunction with a forced draft supply created either by an electric fan mounted behind the heater, a fan driven by the motor of the car, the power being transmitted through a flexible shaft, or by air driven by the motor cooling fan into a funnel-shaped opening through a conducting pipe or hose, and released in the rear of the heater.

The feature of my heater in providing a radiator which is heated from the hottest portion of the exhaust manifold provides a means which will give an intense heat virtually instantaneously with the starting of the motor or internal combustion engine of the motor vehicle. In other heaters where the radiator is designed to use the same fluid which is used in the cooling radiator for the internal combustion engine it takes some little time for the water or fluid to heat up and thus the heating process is much slower just the same as in hot water heaters in homes. In my exhaust heater radiator the heat is directed real hot virtually instantly with the starting of the motor and the apparent advantage of a heater of this nature will be very evident.

A further advantage of my heater resides in the additional exhaust opening from the manifold which assists the escape of the exhaust gases from the manifold where they are crowded in the rapid operation of the motor, rather than retarding the same by passing through my exhaust radiator heater.

A novel feature of primary importance to my invention is the provisions of shutters upon the casing of my heater, making it possible to distribute heat in the direction where it is needed the most, so that the heat from the heater may be forced in the direction of the spot where it is desired.

It is an added feature of my invention to provide a casing for the heating coil of my heater in order that the heater may present a neat and finished appearance within the car, and so that the heater casting is guarded to protect the occupants of the car against coming in contact therewith.

It is a feature of my invention that my heater will act almost instantaneously, the exhaust heating the coil at once, the lower or most effective part of the coil being the first to heat up and the air draft being forced over the heated coil to provide a hot air blast much more quickly than has heretofore been possible.

These features and objects, together with other details and objects of the invention will be more fully and clearly set forth in the specification and claims.

In the drawings forming a part of this specification:

Figure 1 is a perspective view of my heater installed within a motor vehicle.

Figure 2 is a vertical cross section through the center of my heater.

Figure 3 is a front elevation of my heater coil.

Figure 4 is a cross-sectional view of the exhaust gas valve.

Figure 5 is a perspective view of my heater shroud.

Figure 6 is a perspective view of my heater guard plate.

Figure 7:
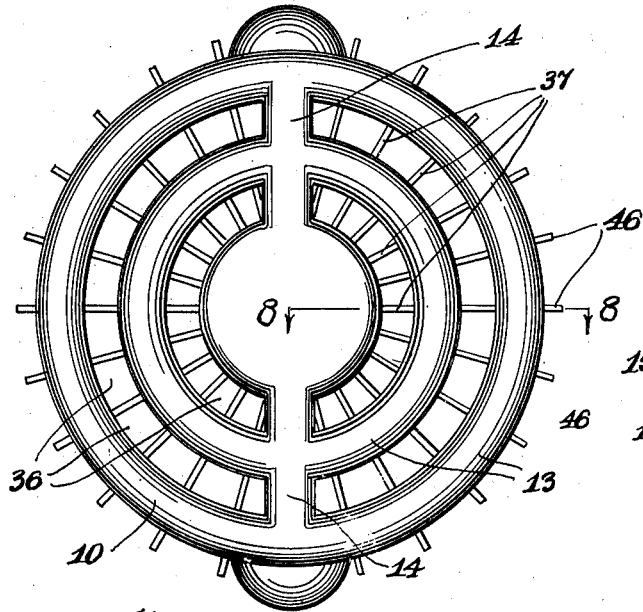
Figure 7 is a front elevation view of an alternate form of heater coil.

My heater A is formed with a heater coil 10 adapted to be positioned within the body of a motor vehicle B through which exhaust from the motor C of the vehicle B is adapted to pass, heating the coil almost instantly after the motor is started.

The heater coil 10 is preferably formed of an integral casting, and is shaped with an inlet opening 11 and an outlet opening 12 for entrance and exit of the exhaust. The heating coil casting may be of any desired shape, and is illustrated as having a series of concentric hollow rings 13 connected by the radial passageways 14 and having a central exhaust chamber 15 within these rings 13 and connected to them by means of the radial passageways 14. Thus, exhaust entering the inlet 11 is free to circulate throughout the rings 13 and the central chamber 15 to heat the entire coil 10 thoroughly.

In order that the heater may be installed within a car in a simple and inexpensive manner, and so that the heater will project inwardly the desired distance from the separating wall between the body of the car and the motor, I provide bushings 16 threaded at one end 17 to fit the threaded end 18 of the inlet opening 11 and outlet opening 12, and threaded at the other end 19 to accommodate nuts 20 and 22. The nuts 20 are for the purpose of adjustably gauging the distance between the heating coil 10 and the supporting wall 23 upon which the heater is mounted, and when the ends 19 of the bushings 16 are inserted in holes drilled for that purpose in the supporting wall 23 until the nuts 20 bear against the wall, the nuts 22 are inserted on the projecting portion of the ends 19 and tightened up on the other side of the wall 23 until the heater A is held securely.

A pipe 24 containing a butterfly valve is screwed into a hole drilled into the hottest portion of the exhaust manifold near the motor exhaust parts, and attached to the bushing 16 leading to the inlet opening 11. A flexible pipe 25, connected with the outlet opening 12 is attached to the exhaust pipe 26 by means of a valve D in such a manner that by operating a valve lever 27 by means of a knob 28 upon the dash board of the automobile B, all or a portion of the exhaust is trapped in the exhaust pipe 26, starting action through the inlet opening 11 to the heater. In the position shown in Figure 4, none of the exhaust would pass through the heater, while if in the dotted position shown, the exhaust would all pass through the heater. If only partly open the valve would cause a syphoning action of part of the gas through the heater. The opening at the hottest point of the manifold allows an easy escape for the gases through the pipe 24, through the coils of the heater, and out through the pipe 25 and through the exhaust 29 to the automobile muffler in the ordinary manner. As the exploded gases composing the exhaust are hot from the time of the first explosion, and as the hot gases may be diverted directly to the heater coil 10 when the motor C has been operating a very short time, the coil 10 becomes hot and radiates a large amount of heat and as the inlet 11 is closely connected with the manifold, the lower portion of the heater is the most effective as it is close to the feet of the occupants and as the top portion is sometimes obscured by the dash board. Because of the use of the hot exhaust it is understood that the flexible pipe 25 is composed of metal or other heat resisting elements.

In conjunction with my heater coil 10, I provide a draft means to force air over the heated coil 10 and to cause this heated air to circulate freely through the body of the car. In Figure 2, this draft means is illustrated in the form of an electric motor 30 which is secured to a bracket 32. This bracket 32 is attached by a pair of clamps 33 to the bushings 16, so that the heater A may be installed or transported as a self-contained unit.

To the shaft 34 of the electric motor 30, I provide a fan 35 which is operated by the motor 30 to force air through the openings 36 between the rings 13 of my heater coil. The surface of the coil 10 is sufficient to heat the air driven through it by the fan 35, so that the air issuing through the heater is very warm.

Figure 8:
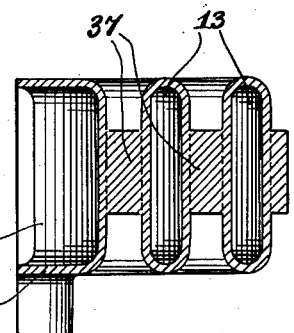
Figure 8 is a section on the lines 8—8 of Figure 7.

In order that even more heated coil surface be exposed to the air forced through the coil 10, I may form my heater coil in the manner illustrated in Figures 7 and 8, with radial fins 37 extending through the openings 36 between the rings 13 of the coil. This structure acts to heat the air to a higher degree, as the fins 37 somewhat retard the passage of air through the heater, keeping the air in contact with the heater for a longer space of time, and the fins 37 also present a much greater surface with which the air may come in contact.

Figure 9:
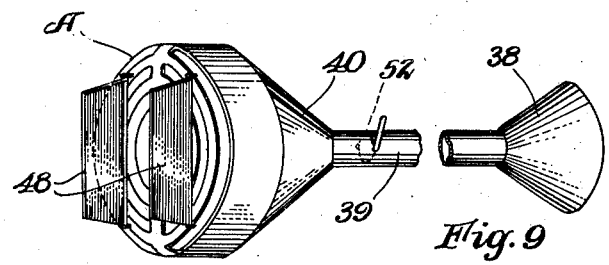
Figure 9 is a perspective view of an alternate form of my heater.
Figure 10:
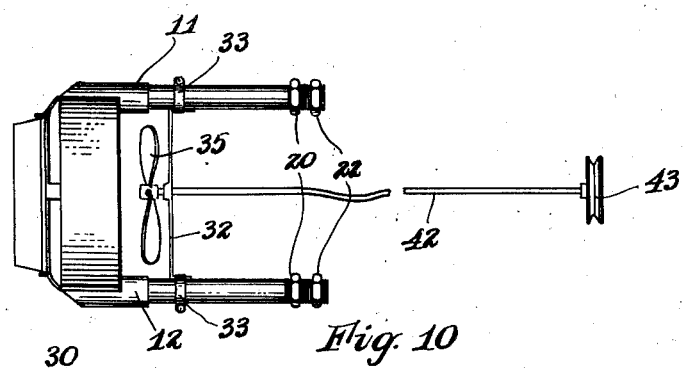
Figure 10 is a diagrammatic side elevation of another alternate form of heater.
Figure 11:
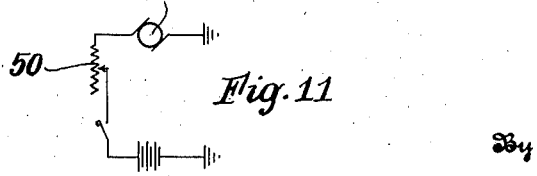
Figure 11 is a wiring diagram showing the method of control of my heater.

Other draft means may be substituted for the motor and fan illustrated in Figure 2 without departing from the spirit of my invention. For instance, a funnel 38 may be placed on the car B, preferably attached just behind the motor cooling fan, and a blast of air conveyed through the tube 39 to a shroud 40 behind the heater coil 10 and projected about the coil 10 in much the same manner as has been described. In this structure shown in Figure 9, the motor 30 and fan 35 could be entirely eliminated. Another method of creating a draft is shown in Figure 10 and is to extend a flexible shaft 42 from the fan 35 to a pulley 43 whereby the fan 35 could be operated by power transmitted by the fan belt 44 of the car motor C through the pulley 43 and shaft 42. Other sources of power could also be devised for operating the fan 35.

To enclose the heater coil 10 to provide a neat and finished appearance, and to protect the occupants of the car from the hot coil 10, I provide a shell 45 shaped in a manner to cover completely the outer edge of the coil 10. The shell 45 is spaced by the lugs 46 away from the surface of the heater coil 10 so that the shell 45 remains relatively cooler than the coil itself. To protect the front exposed surface of the coil 10, and still permit the air draft from the heater to pass out into the body of the car, I provide a guard plate 46' secured to the coil 10 and spaced from it having concentric openings 47 through which the heated air may pass. This guard plate virtually eliminates any danger of anything coming in contact with the heated inner casting.

To provide a directing means for the heated air, so that the heat may be directed to any point where it is most needed within the car, I provide a pair of shutters 48 secured between a pair of outwardly extending lugs 49 and pivotally supported in a manner to provide shutters which may be swung to either side to direct the air draft where it is desired. This feature is of importance as by directing the heat in this manner the comfort of all of the occupants of the car is insured.

In order that the air draft may be varied to provide a more or less heated air as desired, I place a rheostat 50 in conjunction with the electric motor 30, and by operating this rheostat the speed of the motor 30 and amount of the air draft may be controlled. Other means, such as a butterfly valve 52 in the intake air tube 39 may be used if the structure illustrated in Figure 9 is employed.

I have thus provided an exhaust heater, having means associated therewith for providing a variable air draft through or around the heater, and shutters for directing this heat to the position desired. My heater may be manufactured at a low cost, be easily installed, and is a valuable aid in providing comfortable driving in the coldest weather. In warm weather the heater may be positively shut off by operating the butterfly valve in the pipe 24.

In accordance with the patent statutes, I have endeavored to show the best embodiment of my heater and the principal features and operation most desired in carrying out my invention, however, I desire to have it understood that the same is only suggestive of a means of carrying out my invention and that obvious changes may be made within the scope of the following claims without departing from the spirit of the invention.

I claim:

1. An automobile heater including, a radiator comprising a series of concentric passages, a pair of connecting passages between said concentric passages, and guard means held in spaced relationship to said radiator over the front and circumferential edge of said radiator.

2. An automobile heater including, a radiator, a guard plate extending over one side of said radiator and connected in spaced relation thereto, and a sleeve extending in spaced relationship to said radiator over the peripheral edge of said radiator.

3. An automobile heater including, a radiator, a guard plate extending in spaced relationship over the front face thereof, lugs on said plate for attachment with said radiator, and a spaced sleeve connected in spaced relationship about said radiator.

4. An automobile heater including, a radiator, a guard plate spaced from the front face thereof, and shutter means on said guard plate for deflecting air passing through the radiator.

5. An automobile heater including, a radiator, a guard plate extending along one side thereof spaced from said radiator, shutters on said guard plate to deflect air, and means for forcing air through said radiator to be heated thereby and to be deflected by said shutters.

6. An automobile heater including, a radiator, means for forcing air through said radiator to be heated, a guard plate held spaced from the front face of said radiator, shutters on said guard plate. for deflecting the air passing through said radiator, and a sleeve held spaced about the peripheral edge of said heater.

7. An automobile heater including, a radiator, means for forcing air therethrough, a guard plate spaced from the front of said heater, and shutters mounted on said guard plate for deflecting the air passing through said radiator.

CARL A. SCHMIDT.